(12) United States Patent
Cato (10) Patent No.: US 6,616,056 B2
(45) Date of Patent: Sep. 9, 2003

(54) METHOD AND SYSTEM OF CAPTURING AND READING CONSUMER-ORIENTED RESPONSES THROUGH CONSUMER-APPENDED BAR CODES

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/943,800

(22) Filed: Aug. 31, 2001

(65) Prior Publication Data

US 2003/0042312 A1 Mar. 6, 2003

(51) Int. Cl.⁷ .............................................. G06K 21/06
(52) U.S. Cl. ................................................... 235/495
(58) Field of Search ............................... 235/386, 495

(56) References Cited

U.S. PATENT DOCUMENTS

| | | | |
|---|---|---|---|
| 3,839,625 A | * 10/1974 | Chadima, Jr. et al. | 235/495 |
| 4,479,194 A | * 10/1984 | Fogg et al. | 235/386 |
| 4,728,784 A | 3/1988 | Stewart | |
| 4,877,948 A | * 10/1989 | Krueger | 235/449 |
| 4,954,699 A | 9/1990 | Coffey et al. | |
| 5,326,959 A | * 7/1994 | Perazza | 235/379 |
| 5,453,600 A | 9/1995 | Swartz | |
| 5,818,026 A | 10/1998 | Melling et al. | |

* cited by examiner

*Primary Examiner*—Mark Tremblay
(74) *Attorney, Agent, or Firm*—J Bruce Schelkopf (57) ABSTRACT

The disclosed method and system enables the acquisition and capture of consumer information at the time of purchase, such that a product's bar code (UPC) label and a consumer's response are concurrently read at the time of purchase, so as to obtain timely consumer information of high integrity. In one embodiment, a method is provided where the consumer may respond individually to inquiries on a plurality of products such that the consumer's responses are captured at the check-out counter at the time of purchase, and a resulting set of information containing responses to a plurality of specific products can be generated.

33 Claims, 3 Drawing Sheets

METHOD AND SYSTEM OF CAPTURING AND READING CONSUMER-ORIENTED RESPONSES THROUGH CONSUMER-APPENDED BAR CODES

BACKGROUND OF THE INVENTION

1. Field of the Invention

The present invention relates to the field of scanning systems for reading markings, bar codes and hand-mark information and in particular, to a method and system for concurrently reading pre-printed encoded product indicia information (i.e, such as a bar code or a universal product code (UPC)) and a customer's hand-marked information response, while using a traditional bar code reading system.

2. Description of the Related Art

In accordance with recent technical developments, it has become extremely useful to acquire consumer information, both about and from consumers, at various times in a purchasing cycle. Often, manufacturers deploy marketers and survey takers to ask questions directly of consumers. Other cases show that store owners may have prizes, consumer credit points, or drawings from entries provided by consumers in response to certain promotions. While these efforts produce certain insights into a consumer's purchasing habits or interests, often both the surveys and the results are difficult to compile, cumbersome in format, and contain information of limited integrity. If these deficiencies could be overcome, it is believed that retrieved information from consumers would have greater value, improved integrity, be more timely and result in lower expenses.

As such, as is disclosed herein, it would be useful to utilize bar codes, especially in the inventory and sales transactions marketplaces, in order to improve efficiencies of operation and expediencies in order fulfillment in combination with gaining a consumer's response to certain inquiries at the time of purchase. Generally, the transactional efficiencies and technical limitations of various types of bar codes, bar code readers, and bar code reading systems are well-known in the industry.

Typically, bar code reading systems are used for reading pre-printed bar codes (also used herein as "UPC") and are often used in many diverse applications, such as, for example, shipping, manufacturing, and retail point-of-sale (POS) applications. The bar code reading systems are generally arranged to read one or more of the industry standard bar code formats, such as, for example, UPC, Code 39, Interleaved 2 of 5, Discrete 2 of 5, Code 128, Code 93, Codabar, and the like. As is known, a bar code reading system typically reads and decodes the encoded information of bar codes and forms a digital representation of the data which can then be displayed and/or provided to a host computer for subsequent processing.

The industry standard bar codes are generally encoded and pre-printed on packaging for an item (i.e., pre-printed bar code on a grocery item) or are encoded and machine printed on an adhesive label or tag using a laser printer. While these systems have proven to be efficient in certain environments, stray marks or variations in the surface of the bar code have often caused problems in the reading of bar codes. As a result, it is well understood in the art to avoid stray marks or the presence of additional markings near bar codes in order to mitigate problems related with the reading or scanning of the bar codes by a bar code reader. Additionally, it is generally taught in the art to undertake precautions to avoid fraud wherein a UPC code having stray or undecodeable markings is rendered void and unreadable, such that a bar code reading system is unable to affirmatively scan the UPC without intervention by a system operator or cashier.

Separately, certain hand-mark sense system are also being incorporated into certain marketplaces, wherein hand-mark sense information is read from a document by a specialized device. In fact, it is well known to use hand-mark sense information to speed otherwise routine batch-transaction processes. A relatively common example of such a process is that of using hand-mark sense information to indicate an examinee's selection of an answer from a multiple choice examination. In this situation, an examinee darkens a selected answer on an answer sheet at a predetermined point, typically in accordance with a predetermined row selection, to indicate a single selected answer to a particular question. The marked answer sheet may then be read or scanned by an optical reader, which reads which of the possible selections was marked by the examinee. The reader then is able to record the answer selected by the examinee and compare the selected answer with the correct answer as stored in the memory of a connected database. After which, the examinee's answer is assigned a value as being correct or incorrect, and a score is attributed to the examinee for all answers assessed.

Typically, limitations of hand-sense information systems have required an indicia, such as an oval, to be completely marked or filled-in, such that if an examinee were to incompletely mark a selected answer, the reading system may fail to detect the examinee's selected answer. Similarly, due to these shortcomings, if an examinee or testing apparatus were to inadvertently place a stray mark on an answer sheet to be processed, the reading system may fail to accurately read the examinee's selected answer and instead read the inadvertent marking causing the examinee's score to be inaccurate. As is obvious, in retail environments in particular, accuracy in the capture and recording of item and price information is critical.

Accordingly, variations in the size and shape of the document, label or packaging are often limiting as well, and so is the marking and indicia themselves. As a result certain standards in the industry are preferably followed but not necessarily mandated. Further, marks resulting from consumers' scribing hand markings often yields a marking that is distinctively less precise (i.e., non-linear, incomplete, partly-filled, etc.) than marks produced by laser printers or those marks present on bar code labels. As such, the use of hand-markings near or in proximity to bar codes labels is traditionally viewed as a situation to be avoided. Additionally, it is well understood in the art that a hand-mark sense reader is entirely different than a bar code reader, as the former is not capable of reading bar codes, generally costs more to produce than bar code readers, and often is used in combination with data systems that are quite different than systems used with bar code readers.

There do exist certain limited applications in which it is desired to combine both pre-printed bar code symbols with user-scribed data (e.g., hand-mark sense information) on the same document, each of which is inadequate due to their required uses of non-standard methods and/or equipment.

For instance, U.S. Pat. No. 4,728,784 discloses a method and system for reading hand modified bar codes, wherein a user places a marking within a bar code sequence. The reading device of the U.S. Pat. No. 4,728,784 is arranged to read a bar code having a portion thereof hand-modified by a user. The hand-modified bar code is then scanned using a bar code reader and decoded by a to detect which portion of the unique preprinted bar code has been hand-modified. Based upon the position of the hand-mark within the pre-printed bar code, a predetermined character is output by the reading device. However, it is noted that the encoding format of the data is entirely different than the industry standard formats, and that stray markings may have undesirable effects in the in the reading and interpretation of the bar coded information. Accordingly, bar code readers that are arranged to decode bar codes encoded in the industry standard formats can not be used for decoding the bar codes described in the U.S. Pat. No. 4,728,784. As a result, the invention of U.S. Pat. No. 4,728,784 is wholly insufficient and requires customization in its operation, both at a systems level and a user level.

Also U.S. Pat. No. 5,453,600 discloses a method of entering a hand-marked response into a system by altering a predetermined modified bar code symbol in a manner so that the bar code is rendered readable by a bar code reader. The user is to select which of the bar codes is rendered to be readable or non-readable based upon a hand marking apart from the bar codes. Similarly, U.S. Pat. No. 5,453,600 discloses the use of a separate response sheet to identify and select which bar code is to be activated from a sheet of multiple bar code listings thereon. As such, the invention of U.S. Pat. No. 5,453,600 is wholly inadequate and insufficient for the needs addressed herein, and U.S. Pat. No. 5,453,600 also requires additional steps and customization in its operation, additional materials in its application, both at a systems level and a user level.

Based upon observations in a variety of existing markets, such as the POS retails market in particular, there is often marketing information of interest to certain establishments that is requested from a consumer at the time of purchase. Similarly, there are often marketers in stores who seek responses from consumers in survey type situation where they request information about a particular product. From a survey of the markets, at present, there is no method or system that provides a means for allowing a consumer to respond to a selected inquiry for a particular product by marking directly on the product. Further, there is no convenient method or system which provides for both the capture of a consumer's response and the digital acquisition of product information at the time of a purchase transaction. It is believed that such a method and system would greatly reduce costs, improve efficiencies, and enhance consumer involvement in the purchase cycle, while also furthering the acquisition of informative responses beneficial to all stakeholders in the purchasing cycle.

SUMMARY OF THE INVENTION

Accordingly, there is a need for a method and system that provides for the reading of pre-printed bar codes and hand-marked information indicia, concurrently.

It is an object of the present invention to develop a method and system for reading a label having a pre-printed bar code and the presence or absence of one or more hand-mark sense information responses, in proximity to a bar code, such that the limitations of the prior art are overcome.

It is a further object of the present invention to develop a method and system for reading a label having both a pre-printed bar code in standard industry bar code format and a hand-mark sense information indicia therewith, using a common reader which is arranged to read and decode said bar code format and the presence or absence of hand-mark sense information on the hand-mark indicia.

It is a further objective of the present invention to provide a label having a pre-printed bar code and at least one pre-printed consumer response area thereon, arranged in such a manner where a scanner would be able to concurrently read both the bar code information and the consumer response area information.

It is a further objective of the present invention to provide a system for reading and capturing information from a label having a pre-printed bar code and at least one pre-printed consumer response area on a single label which are arranged in such a manner where a scanner of the system would be able to concurrently read both the bar code information and the consumer response area information, and process the scanned information accordingly.

According to one embodiment of the present invention, a method for processing response information from a pre-printed label in relation to bar code information on the label, comprising the steps of: scanning bar code information and response information from a pre-printed label with a bar code reading means operatively connected with a processing means, wherein the label comprises an encoded bar code sequence having encoded bar code information, and an information indicia area, for optionally placing response information thereon, arranged in proximity to the bar code sequence on the label to be concurrently readable by the bar code reading means with the bar code sequence, and processing the scanned information of the initial step with the processing means, is provided for.

According to another embodiment of the present invention, a method for scanning a consumer response from a pre-printed label on a product at the time of purchase, comprising the steps of:

providing a label for a predetermined product, wherein the label comprises a bar code sequence having encoded bar code information, and an information indicia area, for a consumer to optionally mark a response therein, arranged in proximity to the bar code sequence on the label to be concurrently readable by a scanning means with the bar code sequence, providing an inquiry statement to a consumer directing the consumer to respond to the inquiry directly on the label, and scanning the label at the time of purchase by the scanning means to concurrently obtain the consumer response indicated from the indicia area and the bar code information indicated from the bar code sequence, is provided for.

According to a further embodiment of the present invention, an information label, capable of being scanned by a scanning means, comprising an encoded bar code sequence area for providing encoded bar code information and an information indicia area, for optionally placing response information thereon, arranged in proximity to the bar code sequence on the label, is provided for.

According to a further embodiment of the present invention, a label reading system for concurrently reading information from a pre-printed label, comprising: a scanning means for scanning bar code information and response information from a pre-printed label with the scanning means operatively connected with a processing means and a computing means, wherein the label comprises an encoded bar code sequence having encoded bar code information, and an information indicia area, for optionally placing response information thereon, arranged in proximity to the bar code sequence on the label to be concurrently readable by the bar code reading means with the bar code sequence, and a program code for configuring the scanning means to concurrently read a bar code sequence of a predetermined format and a consumer response from an information, is provided for.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

Figure 1:
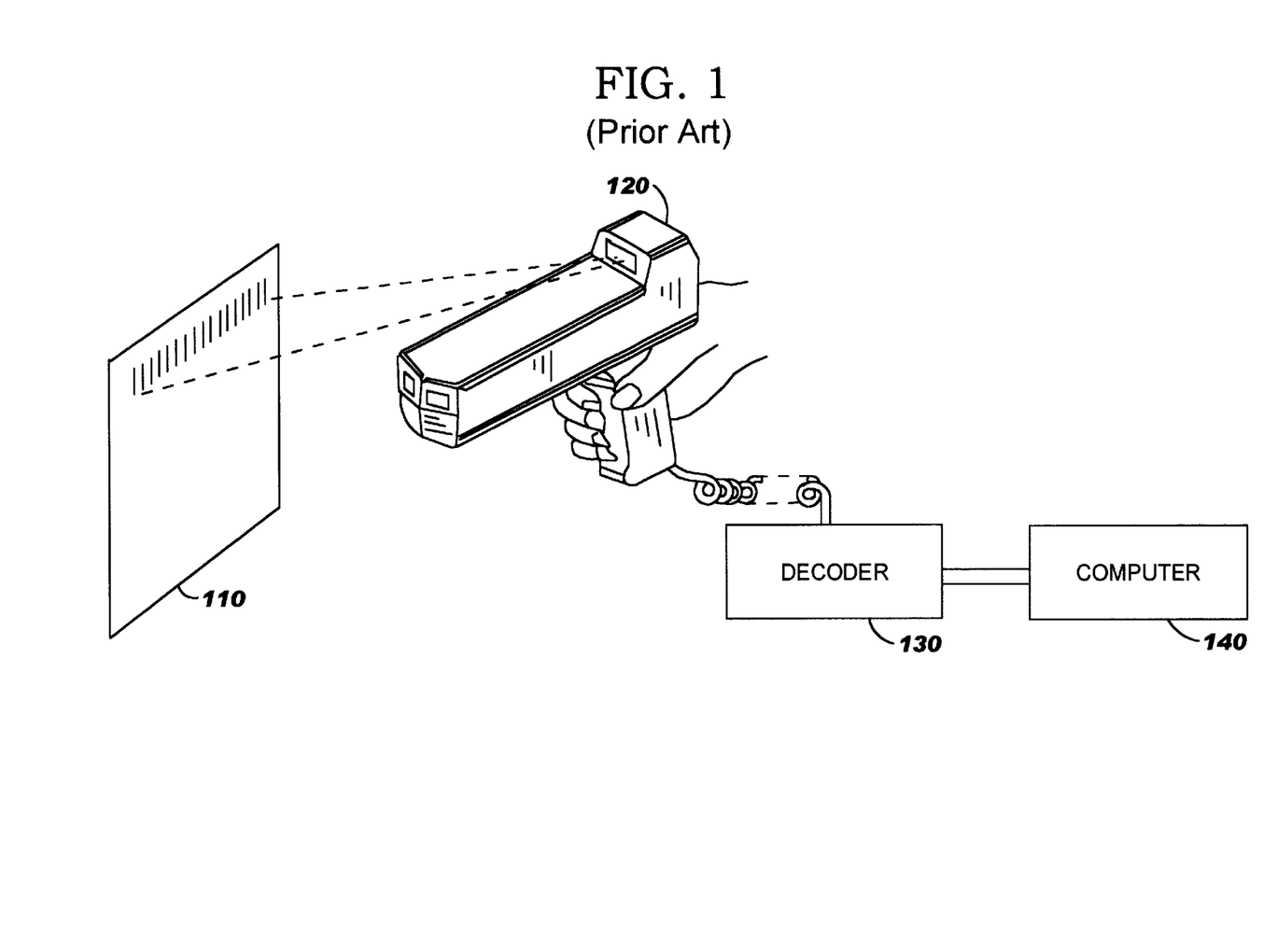
FIG. 1 illustrates a bar code reading system comprising a bar code reader, a decoding means and a computing means.

FIG. 1 illustrates a bar code reading system 100 comprising a bar code reader 120, a decoding means 130 and a computing means 140. Preferably, the system 100 is used for concurrently reading a label 110 of the present invention having at least pre-printed bar code information and a hand-mark information indicia thereon, wherein the system 100 comprises: a bar code reader 120 for scanning the label 110. It is envisioned that various types of existing flat-bed, check-out stand-oriented, or portable, hand-held scanner systems may be used with or in combination with the present invention.

In operation, a label is positioned to be read by the reader. The reader 120 outputs a digitized signal which is representative of the scanned portion of the label. A decode module 130 receives the digitized signal generated in the reader 120, and determines whether the digitized signal represents a bar code conforming to one of the recognized industry standard formats for which the decode module 130 is programmed to decode. If the digitized signal generated in the reader 120 does conform to one of the industry standard formats for which the decode module 130 is programmed to decode, the decode module 130 calculates the desired data, and communicates the data to the host computer 140. Upon receipt, the host computer 140 may use the received data to correspond with databases, look-up tables, and/or other information-based sources. The present invention is not to be defined to be limited by the presence or absence of operatively connected data and information-based sources or repositories.

Figure 2:
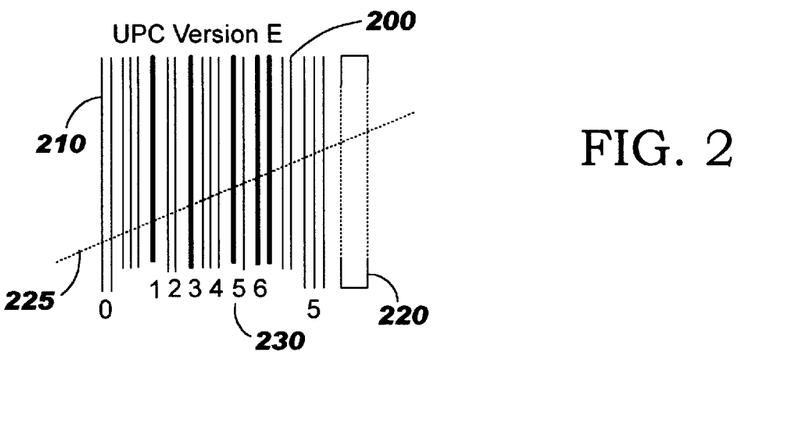
FIG. 2 shows a label to be read by a bar code reading system in accordance with a preferred embodiment of the present invention.

FIG. 2 shows a label 200 to be read by a bar code reading system, not shown, in accordance with a preferred embodiment of the present invention. For illustrative purposes, a bar code 200 having a standard UPC bar code 210 is shown on the label 200, however, the present invention is not so limited to only having the UPC formatted bar code, as other standards and customizations are envisioned herein. Further, for illustrative purposes, a hand-mark information indica area 220 (also used herein as "indicia area") is shown at a predetermined distance from the bar code 210 on the label 200. Although the indicia area 220 is shown to be located at a predetermined distance to the right of the end of the bar code, the present invention is not so limited, such that the indicia area 220 may be located at any distance or location on the label 200 provided that the indicia area is placed in proximity to the bar code 210 to be concurrently readable with the bar code by a bar code reader. For illustrative purposes, it may be assumed that the label 200 contains a UPC bar code 210 having fixed, pre-printed bar code information at 230 describing details of a product to which the label may be affixed. Similarly, for illustrative purposes, the presence of the indicia area 220 is visibly shown in the Figure, however, the visible presence of an outline, marking or perimeter of an indicia area is not necessary for the present invention. Further, for illustration only, a typical path of the scanner is indicated along the laser path 225.

Figure 3:
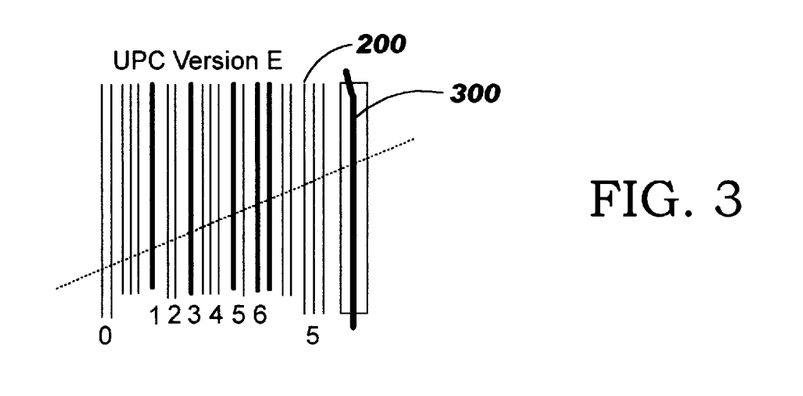
FIG. 3 illustrates the label of FIG. 2 further marked by a consumer to indicate a response to a statement of inquiry in accordance with a preferred embodiment of the present invention.

FIG. 3 illustrates the label 200 of FIG. 2 further marked by a consumer to indicate a response at 300 to a statement of inquiry in accordance with a preferred embodiment of the present invention. For illustrative purposes, the hand-mark information indica area 220 of FIG. 2 is shown at a predetermined distance from the bar code 210 on the label 200. The indicia area 220 is marked with a marking at 300 which is assumed to have been placed there by a consumer. The marking indicates an active response in relation to an event. Although a "box" shape is shown in the Figure at 220, any shape may be configured to be used, and, as such, the invention is not so limited.

Figure 4:
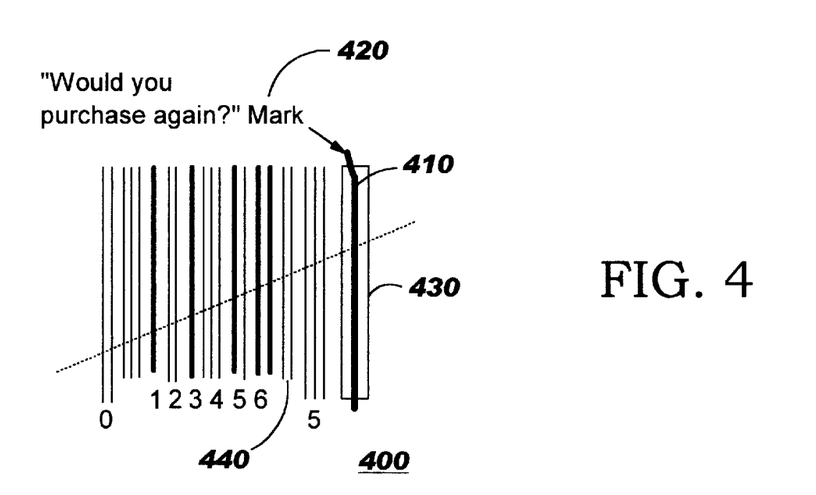
FIG. 4 illustrates a label further marked by a consumer to indicate a response to a pre-printed statement of inquiry on the label, in accordance with a preferred embodiment of the present invention.

FIG. 4 illustrates a label 400 further marked by a consumer at 410 to indicate a response to a statement of inquiry at 420 on the label 400, in accordance with a preferred embodiment of the present invention. The indicia area 430 is marked with a marking at 410 which is assumed to have been placed there by a consumer. The marking indicates an active response in relation to the inquiry statement at 420. The hand-mark information indica area 430 is shown at a predetermined distance from the bar code 440 on the label 400 and the statement at 420 is also shown at a predetermined distance from the bar code 440. Although the indicia area 430 and statement at 420 are shown to be located at a predetermined distances with respect to the bar code 440, the present invention is not so limited, such that the indicia area 430 may be located at any distance or location on the label 400 provided that the indicia area is placed in proximity to the bar code 440 to be concurrently readable with the bar code by a bar code reader, and that the statement at 420 may be located at any distance or location on the label 400 provided that the statement is placed in proximity to the bar code 440 such that the statement does not interfere with the reading means (e.g., bar code reader). Further, it is envisioned that there may exist more than one indicia area arranged on a label such that a scanning means would be able to concurrently read the bar code sequence and the one or more indicia area responses.

Figure 5:
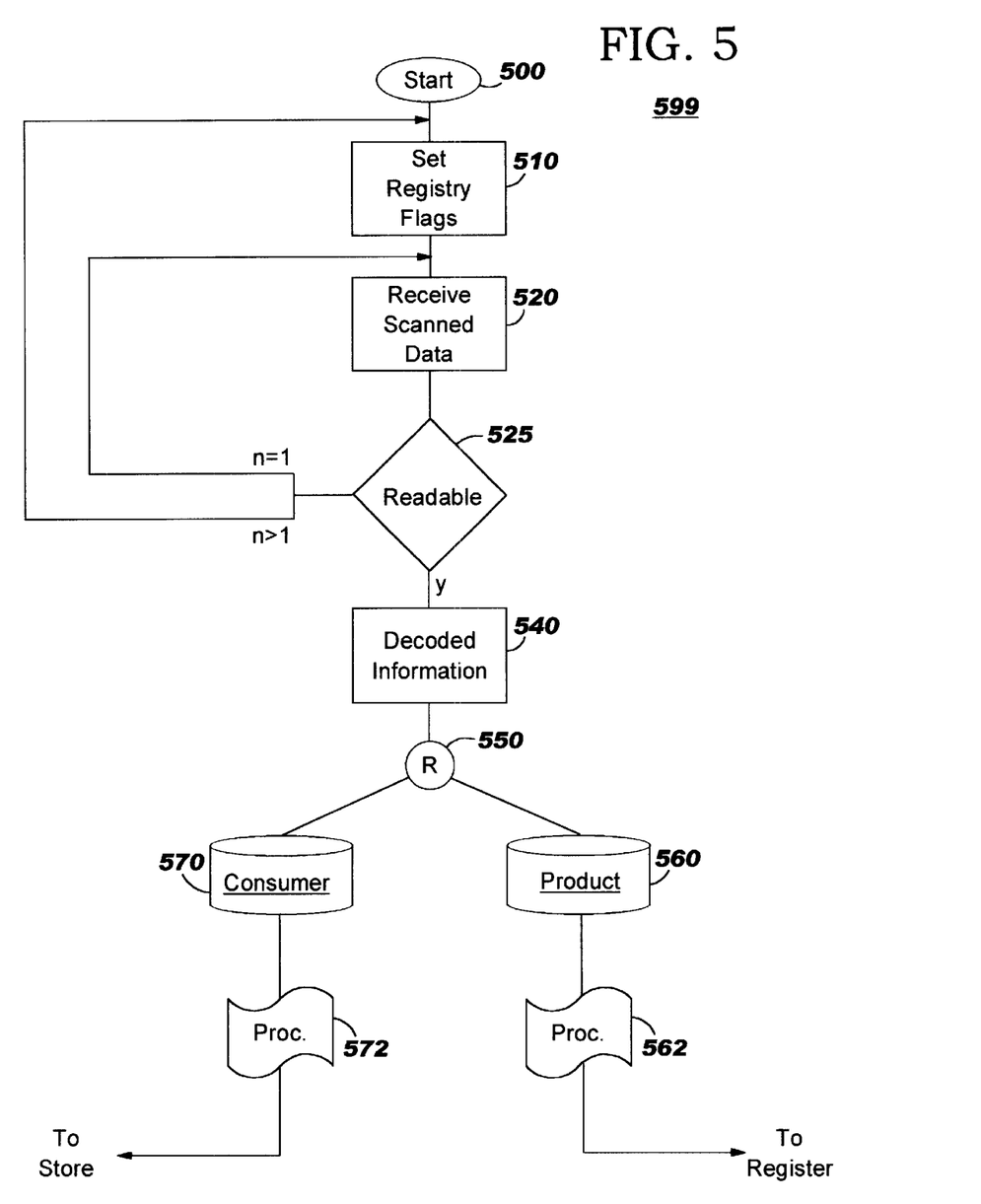
FIG. 5 depicts a flow chart illustrating a method of capturing consumer response information using a label of the present invention and a bar code reading system, in accordance with a preferred embodiment of the present invention.

FIG. 5 depicts a flow chart 599 illustrating a method of capturing consumer response information using a label of the present invention and a bar code reading system, in accordance with a preferred embodiment of the present invention. The method of the present invention in a preferred embodiment begins at 500. At 510, registry flags are set corresponding to bar code information referencing bar code sizing, indicia area location in proximity to the bar code, and indicia area sizing. Preferably, these registry flags may be set by an operator using software (e.g., drivers for the scanning equipment) so as to allow for variations in application and label types. At 520, an operator scans a label, of the present invention, using a bar code reader having registry flags set according to 510. At 525, preferably, a check is made to determine that the bar code label being scanned is readable given the registry formats of 510.

It is known that a scanner is able to determine start and stop characters for the bar code. As such, in conjunction with the registry information, the scanner is able to scan both bar code information and indicia area information from the registry formats. As a part of the registry information, details of whether visible lines, boxes or other markings in the indicia area are known and provided such that a reader is scanning for either known markings or white space. Accordingly, if the registry indicates that an indicia area is preformatted such that a consumer is to mark within a pre-printed box, information obtained from the indicia area will be processed by accounting for the existence of pre-printed lines of a particular dimension and location. In contrast, if the indicia area does not contain pre-printed markings, information obtained from the indicia area will be processed by accounting for the non-existence of pre-printed lines at a particular location. In a preferred embodiment of the present invention, program code is utilized to set registry flags and to identify formats and standards used in the label reading process.

The scanned bar code information and indicia area information are decoded by a decoding module and the decoded information is received at 540. At 550, decoded information is routed to an appropriate database (bar code portion 560 or information response portion 570). Information routed to the bar code database 560 is processed at 562 to provide the transaction register with the appropriate information, such as price, name, manufacturer, and the like, so such may be appropriately displayed and/or recorded at the transaction point (i.e., check-out register). Information routed to the information response database 570 is processed at 572 to correlate the response received with the appropriate item scanned. Accordingly, once the decoded bar code and information response data has been processed, scanning of the next item may proceed.

The use of two databases is for illustrative purposes only and is not meant to convey a requirement that there exist two distinct databases. It is envisioned and understood by those of ordinary skill that the information received may be processed in a single database. Further, it is also envisioned and understood by those skilled in the art that response information obtained may be transmitted to interested entities, and/or that a coupon or other appreciation tool may be generated at the transaction point for the consumer's benefit.

In a further embodiment, it is envisioned that the correlated data of the information response database may be further sorted, prioritized, augmented and utilized, alone or in combination, with other information and data so as to provide information as to use, trends, frequencies, preferences, etc., to manufacturers, producers, store owners, consumers, and marketing channels.

It is known in the art that bar codes comprise information indicating start and stop characters such that a reader in combination with a decoder is able to readily identify and decode bar code information relative to its beginning and ending on a label, wherein such information is incorporated herein by reference. For example, in a retail environment, when a bar code label is scanned, a decode module generates the decoded data which is provided to a connected host computer. The host computer provides information corresponding to the decoded data to the check-out register where after information such as product name, weight, price and the like, may be received and accordingly processed for consumer transaction.

It is also known that a standard bar code may have an extremely tolerant format, and, as such, reasonable deviations in the width of the hand-marked indications from the width of the indicia area will not prevent proper decoding nor will interfere with information from the bar code portion of the label. However, in the present invention, the indicia area is not limited by or restricted to the dimensional limitations of any bar code standard or format, as the indicia area is separate and apart from the bar code sequence and the minimal area of the label reserved for a bar code sequence. As such, a consumer's response, when marked in the indicia area, is permitted to be dimensionally different than the representations of and in the bar code sequence without affecting the readability of the present invention. Preferably, the indicia area is placed in close proximity in a location at or slightly beyond the outer perimeter of a bar code sequence (i.e., the required area needed for a bar code sequence as determined by the respective standard) so as to optimize the use of a label's limited printable surface area while providing a label of a minimal size which accommodates the bar code sequence and the indicia areas.

As used herein, the term "bar code" is to be further defined to include a plurality of encoded bar sequences, where each bar code comprises a unique predetermined character string and includes a plurality of spaces and a plurality of bars, preferably but not exclusively, of standard format in the industry. As used herein, the term "hand-mark information indicia" comprises a defined area in proximity to a bar code label arranged to render the bar code sequence and indicia area concurrently readable by a bar code decoding device when such device reads the combination of the label and indicia.

As used herein, the terms "hand-mark information," "hand-markings," "hand-mark sense information," and "hand-made marks" are used interchangeable such that the use of any one of such terms is included to be interpreted as meaning each, any and all of the others without limitation.

Although the present invention has been described in the context of that involving a label used in relation to a computer-based bar code reading system, those skilled in the art will understand that the present invention can be implemented with any suitable type of information handling device capable of reading the label.

While the exemplary embodiments of the present invention have been set forth, the present invention is not so limited. As would be apparent to one skilled in the art, various functions of circuit elements may also be implemented in the digital domain as processing steps in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing response information from a pre-printed label in relation to bar code information on the label, comprising the steps of:
    a) scanning bar code information and response information from a pre-printed label with a bar code reading means operatively connected with a processing means, wherein the label comprises an encoded bar code sequence having encoded bar code information, and an information indicia area, for optionally placing response information thereon, arranged in proximity to the bar code sequence on the label to be concurrently readable by the bar code reading means with the bar code sequence, and
    b) processing the scanned information of step (a) with the processing means.

2. The method according to claim 1, wherein the processing means further comprises a decoding means and a data correlation means, wherein scanned data is decoded by the decoding means and decoded data is correlated with bar code information by the correlation means to generate correlated data responses.

3. The method according to claim 2, wherein the indicia area is visibly marked thereby indicating the presence of response information on the label.

4. The method according to claim 3, wherein a response ratio of visibly marked indicia areas versus unmarked indicia areas is determined in relation to a plurality of correlated data responses.

5. The method according to claim 3, further comprising the step of storing the processed information of step(b) by a storing means.

6. The method according to claim 4, wherein the indicia area is visibly marked by hand.

7. A method for processing response information from a pre-printed label in relation to bar code information on the label at the time of a consumer's purchase at a transaction center, comprising the steps of:
    a) scanning bar code information and response information from a pre-printed label with a bar code reading means operatively connected with a processing means, wherein the label comprises
        an encoded bar code sequence having encoded bar code information, and an information indicia area, for optionally placing response information thereon, arranged in proximity to the bar code sequence on the label to be concurrently readable by the bar code reading means with the bar code sequence,
    b) processing the scanned information of step (a) with the processing means,
        wherein the processing means further comprises a decoding means, a data correlation means and a computing means, wherein scanned data is decoded by the decoding means and decoded data is correlated with bar code information by the correlation means and by the computing means to generate correlated data responses, and to provide transaction information in response to the processed bar code information to the transaction center, and
    c) storing the processed information of step(b) by a storing means.

8. The method according to claim 7, wherein the indicia area is visibly marked thereby indicating the presence of response information on the label.

9. A method for scanning a consumer response from a pre-printed label on a product at the time of purchase, comprising the steps of:
    a) providing a label for a predetermined product,
        wherein the label comprises a bar code sequence having encoded bar code information, and an information indicia area, for a consumer to optionally mark a response therein, arranged in proximity to the bar code sequence on the label to be concurrently readable by a scanning means with the bar code sequence,
    b) providing an inquiry statement to a consumer directing the consumer to respond to the inquiry directly on the label, and
    c) scanning the label at the time of purchase by the scanning means to concurrently obtain the consumer response indicated from the indicia area and the bar code information indicated from the bar code sequence.

10. The method according to claim 9, wherein the pre-printed label further comprises the inquiry statement.

11. The method according to claim 9 further comprising the step of:
    d) processing the scanned information of step (c) by a processing means to determine the consumer response.

12. The method according to claim 11 further comprising the step of:
    e) storing the consumer response of step (d) by a storing means.

13. A method for capturing consumer response from a pre-printed label on a consumer-selected product at the time of purchase, comprising the steps of:
    a) providing a label on the consumer-selected product,
        wherein the label comprises a bar code sequence having encoded bar code information, and an information indicia area, for a consumer to optionally mark a response therein, arranged in proximity to the bar code sequence on the label to be concurrently readable by a scanning means with the bar code sequence, and
    b) capturing the consumer response by
        i) scanning the label at the time of purchase by the scanning means
        ii) decoding the scanned information of step (ci),
        iii) processing the decoded information of step (cii), and
        iv) storing the processed consumer response by a storage means.

14. The method according to claim 13, wherein the label further comprises an inquiry statement.

15. The method according to claim 14, wherein the inquiry statement directs the consumer to respond to the inquiry by visibly marking the information indicia area directly.

16. An information label, capable of being scanned by a scanning means, comprising an encoded bar code sequence area for providing encoded bar code information and at least one information indicia area, for optionally placing response information thereon, arranged in proximity to the bar code sequence on the label.

17. The label according to claim 16 wherein the information indicia area is arranged in proximity to the bar code sequence on the label to be concurrently readable by the scanning means with the bar code sequence.

18. The label according to claim 16 further comprising an inquiry statement area.

19. The label according to claim 16 further comprising a pre-printed encoded bar code sequence.

20. The label according to claim 16 further comprising a printed information indicia area.

21. The label according to claim 18 wherein the inquiry statement area directs the consumer to respond to the inquiry by visibly marking the information indicia area directly.

22. The label according to claim 18 further comprising a printed inquiry in an inquiry statement area.

23. The label according to claim 18 affixed to an item.

24. Packaging for a product having information label, capable of being scanned by a scanning means, comprising an encoded bar code sequence area for providing encoded bar code information and at least one information indicia area, for optionally placing response information thereon, arranged in proximity to the bar code sequence on the label, wherein the information indicia area is arranged in proximity to the bar code sequence on the label to be concurrently readable by the scanning means with the bar code sequence.

25. The packaging according to claim 24, wherein the label further comprises a pre-printed inquiry statement area which directs the consumer to respond to the inquiry by visibly marking the information indicia area directly.

26. An inventory tracking method for determining future orders for a predetermined item having a pre-printed information label, based on one or more consumer responses received at the time of purchase on one or more labels of said predetermined item, comprising the steps of:
  a) providing a label on the product,
    wherein the label comprises a bar code sequence having encoded bar code information, an information indicia area, for a consumer to optionally mark a response therein, arranged in proximity to the bar code sequence such that the label is readable by a scanning means, and an inquiry statement soliciting the consumer to affirmatively respond to future purchases of the product,
  b) scanning the label at the time of purchase by the scanning means to obtain the consumer response indicated in the indicia area,
  c) decoding the consumer response to be either marked or unmarked,
  d) processing the consumer response in relation to planned orders for the product,
  e) storing order information in relation to processed consumer responses, and
  f) generating an order for the predetermined item based upon stored consumer responses over a predetermined period of time.

27. A machine-readable medium, having encoded thereon program code, wherein, when the program code is executed by a machine upon a predetermined event, the machine implements the steps of:
  a) scanning bar code information and response information from a pre-printed label with a scanning means operatively connected with a processing means and a computing means,
    wherein the label comprises an encoded bar code sequence having encoded bar code information, and at least one information indicia area, for optionally placing response information thereon, wherein each indicia area is arranged in proximity to the bar code sequence and each other indicia area on the label to be concurrently readable by the scanning means with the bar code sequence, such that the scanning means reads a bar code sequence of a predetermined format and also reads a consumer response from an information indicia area positioned at a predetermined location in relation to the bar code sequence,
  b) processing the scanned information of step (a) with the processing means, and
  c) storing the consumer response information processed in step (b), by the computing means.

28. The medium according to claim 27, wherein the scanning means is configurable to scan a bar code sequence and at least one information indicia areas in one or more differing arrangements.

29. A label reading system for concurrently reading information from a pre-printed label, comprising:
  a) a scanning means for scanning bar code information and response information from a pre-printed label with the scanning means operatively connected with a processing means and a computing means, wherein the label comprises an encoded bar code sequence having encoded bar code information, and an information indicia area, for optionally placing response information thereon, arranged in proximity to the bar code sequence on the label to be concurrently readable by the bar code reading means with the bar code sequence, and
  b) a program code for configuring the scanning means to concurrently read a bar code sequence of a predetermined format and a consumer response from an information indicia area positioned at a predetermined location in relation to the bar code sequence.

30. The system according to claim 29, further comprising the steps of:
  c) a decoding means for decoding the scanned information of step (a), and
  d) a response means for providing purchase information in response to a decoded bar code sequence to a display.

31. A method for processing a plurality of consumer responses about a labeled item from a pre-printed label, comprising the steps of:
  a) scanning bar code information and a plurality of consumer responses from a pre-printed label with a scanning means operatively connected with a computing means,
    wherein the label comprises
      an encoded bar code sequence having encoded bar code information, and two or more information indicia areas, for optionally placing response information thereon,
      wherein each indicia area is arranged in proximity to the bar code sequence and each other indicia area on the label to be concurrently readable by the scanning means with the bar code sequence, and b) processing the scanned information of step (a) with the computing means.

32. A method of doing business in a retail store environment wherein a consumer's response is digitally captured by a scanning means reading the consumer's response on a predetermined product's bar code label, which has been marked by a consumer in an indicia area on the label, at the time of purchase at a transaction center, and the consumer's response is correlated with related information regarding the predetermined product over a predetermined period of time, comprising the steps of:

a) printing a label for a predetermined product in a retail environment, wherein the label comprises an encoded bar code sequence having encoded bar code information, and an information indicia area, for a consumer to place the consumer response thereon by marking, arranged in proximity to the bar code sequence on the label to be concurrently readable by the bar code reading means with the bar code sequence, b) positioning the label at a predetermined location on the product, c) scanning the label of the predetermined product at the transaction center, thereby scanning bar code information and consumer response information from the label using a bar code reading means operatively connected with a processing means, a decoding means and a computing means, d) decoding the bar code information and the consumer response information with the decoding means, e) processing the decoded bar code information and the decoded consumer response information with the processing means, f) providing product transaction information in relation to the processed decoded bar code information to the transaction center with the computing means whereby product information about the predetermined product is presented to the consumer, and g) correlating consumer response information in relation to the decoded consumer response information with the related information regarding the predetermined product over a predetermined period of time.

33. The method according to claim 32, further comprising the step of:

h) generating a report for the predetermined product based upon the correlated information of step (g).

* * * * *